United States Patent
Sitaraman

(10) Patent No.: US 8,473,629 B2
(45) Date of Patent: *Jun. 25, 2013

(54) METHOD AND SYSTEM FOR ENHANCING LIVE STREAM DELIVERY QUALITY USING PREBURSTING

(75) Inventor: Ramesh K. Sitaraman, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,918

(22) Filed: Mar. 12, 2012

(65) Prior Publication Data

US 2012/0290737 A1  Nov. 15, 2012

Related U.S. Application Data

(63) Continuation of application No. 13/007,696, filed on Jan. 17, 2011, now Pat. No. 8,135,855, and a continuation of application No. 12/185,139, filed on Aug. 4, 2008, now Pat. No. 7,873,740, and a continuation of application No. 10/410,986, filed on Apr. 10, 2003, now Pat. No. 7,409,456.

(60) Provisional application No. 60/371,463, filed on Apr. 10, 2002.

(51) Int. Cl.
  *G06F 15/16* (2006.01)
(52) U.S. Cl.
  USPC .......... 709/231; 709/213; 709/215; 709/217; 709/233; 370/466; 370/469

(58) Field of Classification Search
  USPC ........... 709/213–219, 225–233; 370/466–469
  See application file for complete search history.

(56) References Cited

U.S. PATENT DOCUMENTS

| | | | |
|---|---|---|---|
| 5,886,276 A | 3/1999 | Levine et al. | |
| 5,918,020 A | 6/1999 | Blackard et al. | |
| 5,930,473 A * | 7/1999 | Teng et al. | 709/219 |
| 5,963,202 A | 10/1999 | Polish | |
| 6,028,843 A | 2/2000 | Delp et al. | |
| 6,125,396 A | 9/2000 | Lowe | |
| 6,272,566 B1 | 8/2001 | Craft | |
| 6,646,988 B1 | 11/2003 | Nandy et al. | |
| 6,665,726 B1 | 12/2003 | Leighton et al. | |
| 6,731,649 B1 | 5/2004 | Silverman | |
| 6,751,673 B2 * | 6/2004 | Shaw | 709/231 |
| 6,766,376 B2 | 7/2004 | Price | |
| 6,795,445 B1 * | 9/2004 | Kabie et al. | 370/469 |
| 7,010,598 B2 | 3/2006 | Sitaraman et al. | |
| 7,076,560 B1 | 7/2006 | Lango et al. | |
| 7,149,807 B1 | 12/2006 | Kontothanassis | |
| 8,135,855 B2 * | 3/2012 | Sitaraman | 709/231 |

* cited by examiner

*Primary Examiner* — Bharat N Barot
(74) *Attorney, Agent, or Firm* — David H. Judson

(57) ABSTRACT

A method accelerates the delivery of a portion of a data stream across nodes of a stream transport network. A portion of a live stream is forwarded from a first node to a second node in a transport network at a high bitrate as compared to the stream's encoded bitrate, and thereafter, the stream continues to be forwarded from the first node to the second node at or near the encoded bitrate. This technique provides significant advantages in that it reduces stream startup time, reduces unrecoverable stream packet loss, and reduces stream rebuffers as the stream is viewed by a requesting end user that has been mapped to a media server in a distributed computer network such as a content delivery network.

7 Claims, 4 Drawing Sheets

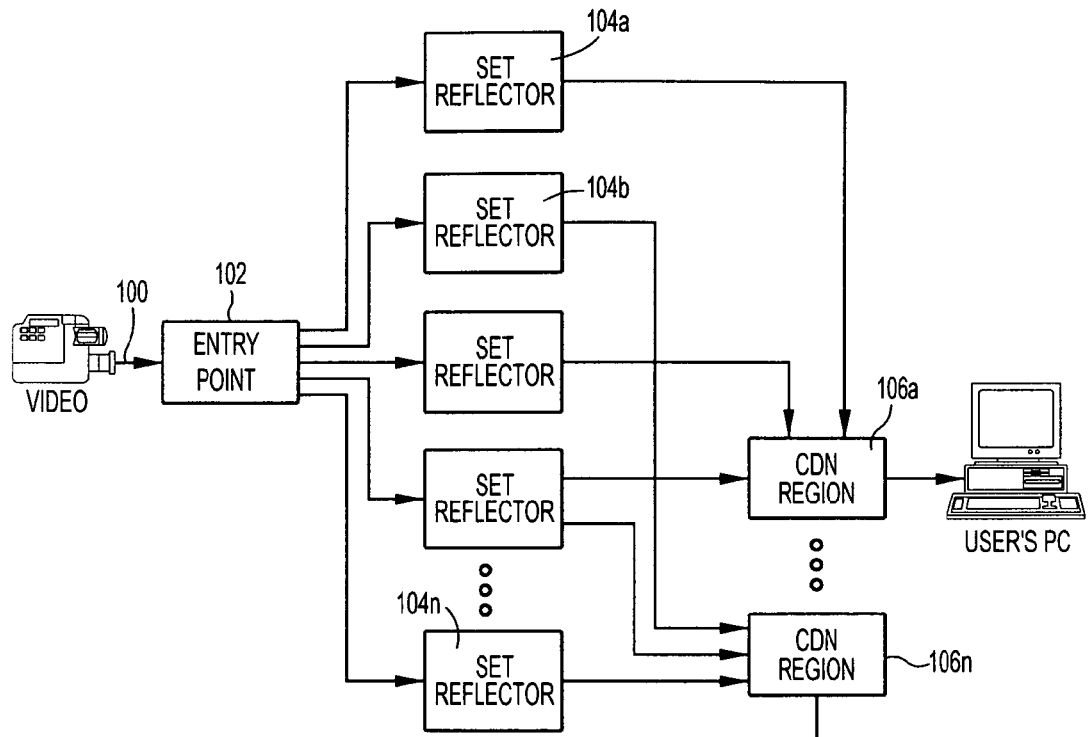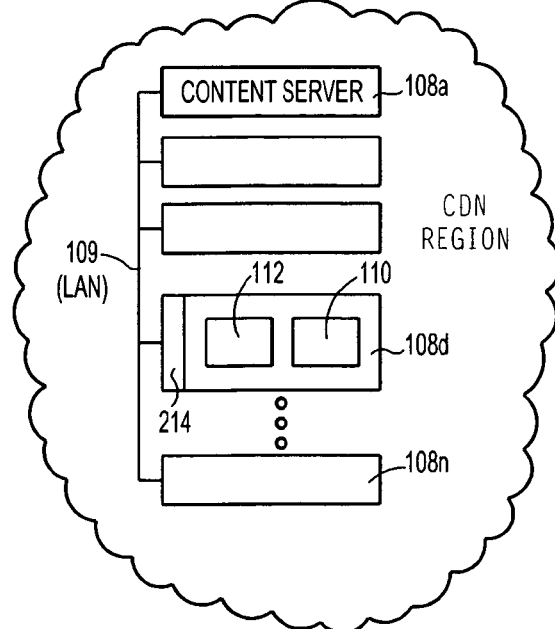
FIG. 1

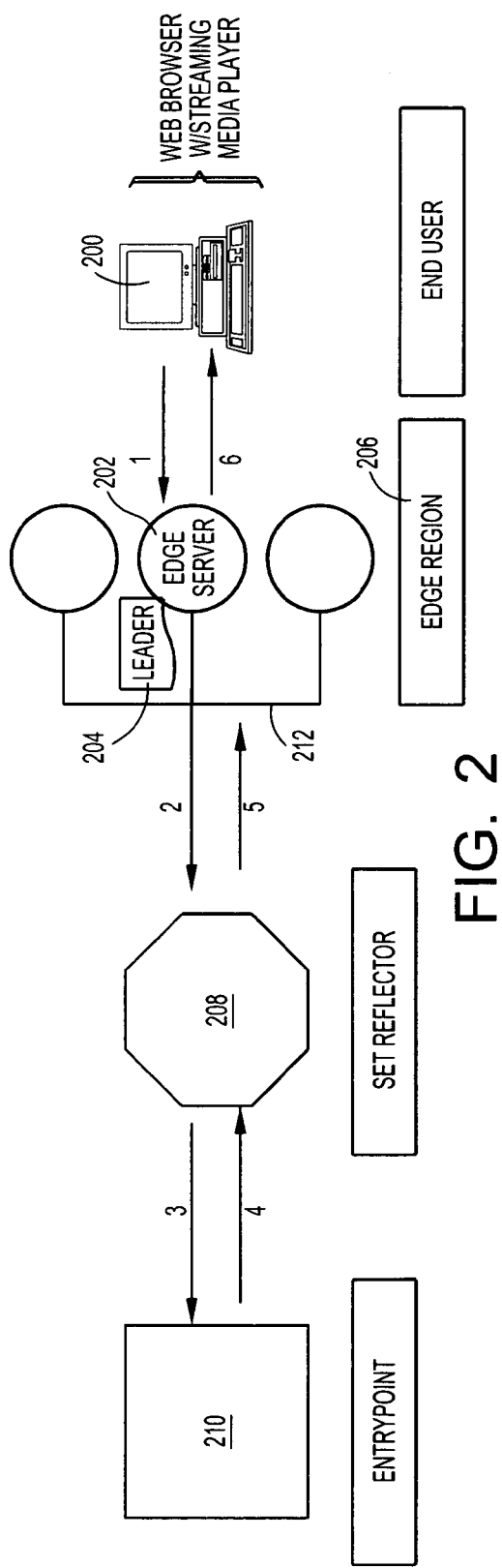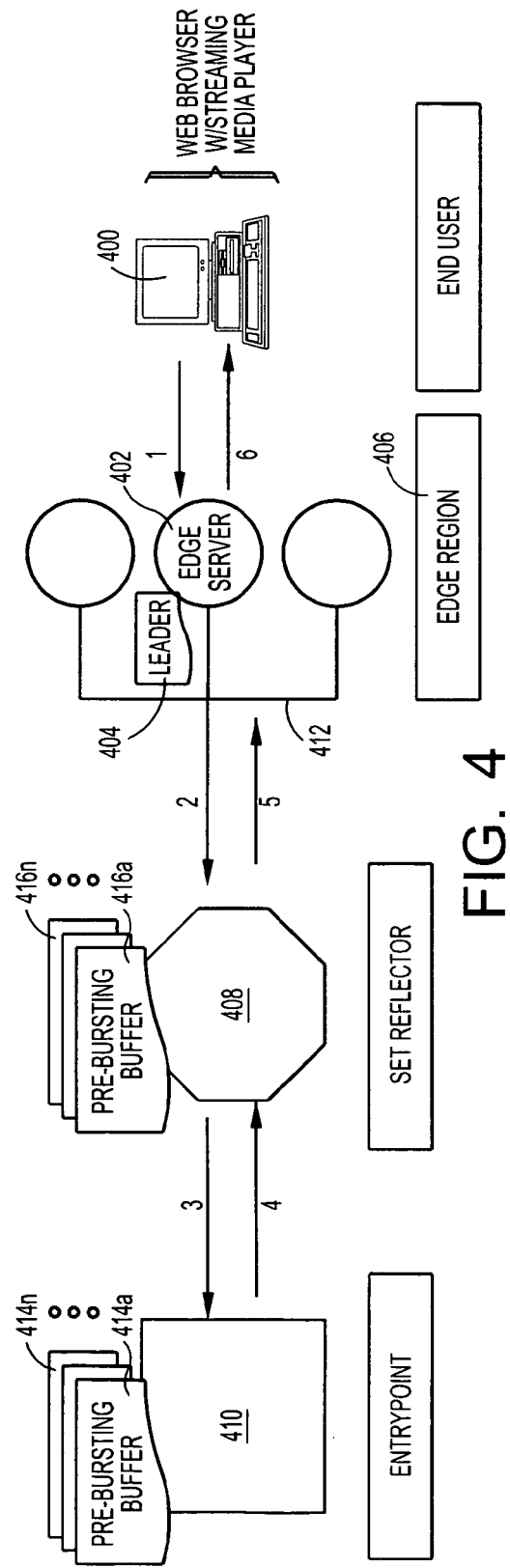

METHOD AND SYSTEM FOR ENHANCING LIVE STREAM DELIVERY QUALITY USING PREBURSTING

This application is a continuation of Ser. No. 13/007,696, filed Jan. 17, 2011, now U.S. Pat. No. 8,135,855, which application was a continuation of Ser. No. 12/185,139, filed Aug. 4, 2008, now U.S. Pat. No. 7,783,740, which application was a continuation of Ser. No. 10/410,986, filed Apr. 10, 2003, now U.S. Pat. No. 7,409,456, which application was based on and claimed priority to Ser. No. 60/371,463, filed Apr. 10, 2002.

BACKGROUND OF THE INVENTION

1. Technical Field

The present invention relates generally to high-performance, fault-tolerant streaming media delivery in a content delivery network (CDN).

2. Description of the Related Art

Streaming media is a type of Internet content that has the important characteristic of being able to be played while still in the process of being downloaded. A client can play the first packet of the stream, and decompress the second, while receiving the third. Thus, an end user can start enjoying the multimedia without waiting to the end of transmission. Streaming is very useful for delivering media because media files tend to be large, particularly as the duration of the programming increases. Indeed, for live events, the file size is, in effect, infinite. To view a media file that is not streamed, users must first download the file to a local hard disk—which may take minutes or even hours—and then open the file with player software that is compatible with the file format. To view streaming media, the user's browser opens player software, which buffers the file for a few seconds and then plays the file while simultaneously downloading it. Unlike software downloads, streaming media files are not stored locally on a user's hard disk. Once the bits representing content are used, the player typically discards them.

Streaming media quality varies widely according to the type of media being delivered, the speed of the user's Internet connection, network conditions, the bit rate at which the content is encoded, and the format used. In general, streaming audio can be FM quality, but, given typical bandwidth constraints, streaming video is poor by TV standards, with smaller screens, lower resolution, and fewer frames per second. The source for streaming media can be just about any form of media, including VHS or Beta format tapes, audio cassettes, DAT, MPEG video, MP3 audio, AVI, and the like. Prior to streaming, the content must first be encoded, a process which accomplishes four things: conversion of the content from analog to digital form, if necessary; creation of a file in the format recognized by the streaming media server and player; compression of the file to maximize the richness of the content that can be delivered in real-time given limited bandwidth; and, establishing the bit rate at which the media is to be delivered. Content owners typically choose to encode media at multiple rates so that users with fast connections get as good an experience as possible but users with slow connections can also access the content.

Non-streaming content is standards-based in the sense that the server and client software developed by different vendors, such as Apache server, Microsoft Internet Explorer, Netscape Navigator, and the like, generally work well together. Streaming media, however, usually relies on proprietary server and client software. The server, client, production and encoding tools developed by a streaming software vendor are collectively referred to as a format. Streaming media encoded in a particular format must be served by that format's media server and replayed by that format's client. Streaming media clients are often called players, and typically they exist as plug-ins to Web browsers. Streaming media clients are also often capable of playing standards-based non-streaming media files, such as WAV or AVI. The three major streaming media formats in use today are: RealNetworks RealSystem G2, Microsoft Windows Media Technologies ("WMT"), and Apple QuickTime. RealSystem G2 handles all media types including audio, video, animation, and still images and text. RealSystem G2 and QuickTime support SMIL, an XML-based language that allows the content provider to time and position media within the player window. To deliver the media in real time Real and QuickTime use RTSP.

It is well-known to deliver streaming media using a content delivery network (CDN). A CDN is a network of geographically distributed content delivery nodes that are arranged for efficient delivery of digital content (e.g., Web content, streaming media and applications) on behalf of third party content providers. Typically, a CDN is implemented as a combination of a content delivery infrastructure, a DNS-based request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. In live streaming, the origin server may include an encoder. An effective CDN serves frequently-accessed content from a surrogate that is optimal for a given requesting client. In a typical CDN, a single service provider operates the request-routers, the surrogates, and the content servers. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

As described in U.S. Pat. No. 6,665,726, which is incorporated herein by reference, live streaming can be further enhanced by having the CDN send multiple copies of the same stream over different routes from a CDN entry point to the optimal streaming server at the edge of the Internet. These copies are then combined to form one complete, original-quality stream, which is sent from the streaming server to the end users. FIG. 1 illustrates this process in more detail. A broadcast stream 100 is sent to a CDN entry point 102. An entry point, for example, typically comprises two servers (for redundancy), and each server can handle many streams from multiple content providers. Once the entry point receives the stream, it rebroadcasts copies of the stream to so-called reflectors 104a-n. The streams preferably are multiplexed and delivered to the set reflectors preferably via UDP (e.g., WMT encapsulated in UDP over IP). These reflectors are preferably diverse from a network and geographic standpoint (e.g., at diverse Internet backbone data centers) to ensure fault tolerance. Each reflector, in turn, rebroadcasts its copy of the stream to each subscribing region, e.g., region 106d, of a set of regions 106a-n. A subscribing region 106d typically is a CDN region that contains one or more streaming edge nodes 108a-n to which user(s) have been routed by the CDN DNS-based request-routing mechanism. In other words, set reflectors send their streams to every edge region where they are needed. A CDN region, in this example, includes a set of edge nodes connected by a common backbone 109, e.g., a local area network (LAN). Typically, an edge node, e.g., node 108d, comprises a streaming server 112 and it may include a cache 110. A representative server runs an Intel processor, the Linux operating system and a Real Media or QuickTime Server. For Windows-based platforms, a representative server runs an Intel processor, Windows NT or 2000, and a Windows Media Server.

The reflector network is used within a content delivery network to enable requesting end users to subscribe to live streams that have been published to CDN entry points. A reflector typically is a generalized packet router program. The reflector network preferably comprises a hierarchy of reflectors that are located at the various entry points into the CDN, at each edge node at which requesting users may be directed by the CDN to obtain live streams, and at various "reflector" nodes located within at least one intermediate layer (in the hierarchy) between the entry points and the edge nodes. As described in U.S. Pat. No. 6,751,673, the edge nodes and each reflector node may also include a manager program that arranges for feeds. When an end user is directed to an edge node that is not yet receiving the desired stream, the edge node's manager issues a subscription request to a set of reflector nodes. If the reflector node(s) are already receiving the desired stream, their reflector(s) begin sending it to the requesting edge node. If, however, the reflector node(s) are not already receiving the desired stream, their manager programs issue the subscription request to the entry point(s) to start the feed. In such a live transport network, the entrypoint announces the existence of a stream to reflectors, while edge reflectors in a given region subscribe for the stream. The reflectors propagate this subscription to the entrypoint, receive the data, and propagate the data to the edge reflectors, who then send it to media servers over a backend network.

From April 2001 to April 2002, the number of high-speed, home-based Internet users in the United States grew from 15.9 million to 25.2 million individuals. Even with low-cost, high-speed Internet connections, delivering streaming media to end users is difficult. Due to widely acknowledged Internet bottlenecks, many consumers are forced to endure slow and unreliable startup of audio and video streams, periods during which significant rebuffering interrupts the experience, or degraded quality of delivery that leads to choppy "slideshow" quality instead of smooth video. Unfortunately, for content providers, site visitors do not find such experiences compelling and, thus, streaming media production dollars often are wasted while important branding and product messages never reach their intended audience.

Therefore, for customers seeking an optimal return on their streaming media investment, it is important that end users attempting to view or listen to a stream have a high quality experience—one that delivers the content as well as entices the user to return to the site.

It would be desirable to provide techniques for enhancing the end user quality of media streams. The present invention addresses this problem.

BRIEF SUMMARY

The subject matter herein relates generally to improving how a live data stream is delivered between network nodes in a distributed computing network, such as a content delivery network (CDN).

It is a general object of the invention to enhance how a live streaming transport network is used in a content delivery network.

It is a more general object of the invention to enhance the quality of an end user's perception of a media stream such as an audio or video file that is delivered over a computer network.

It is a more specific object of the invention to "accelerate" the delivery of a portion of a data stream across nodes of a stream transport network. According to the invention, a portion of a live stream is forwarded from a first node to a second node in a transport network at a high bitrate as compared to the stream's encoded bitrate, and thereafter, the stream continues to be forwarded from the first node to the second node at or near the encoded bitrate. The disclosed technique of forwarding a portion of a stream at a high bitrate as compared to the encoded bitrate of the stream is sometimes referred to as "prebursting" the stream. This technique provides significant advantages in that it reduces stream startup time, reduces stream packet loss, and reduces stream rebuffers as the stream is viewed by a requesting end user that has been mapped to a media server in a distributed computer network such as a content delivery network In an illustrated embodiment, each node in a live streaming transport network retains a history (e.g., "n" seconds of the stream, or "b" bytes of data of the stream, which amount is configurable) of every stream that passes through the node. Preferably, the node stores a history for every stream to which it is subscribed if a subscription-based system is being employed in the transport network. This history preferably is stored in a buffer, memory, cache, disk or other suitable datastore. When the node receives a request (e.g., a subscription request) for the stream from another node, the first node forwards the history to the requesting node at a bitrate that is higher (e.g., 8×, which amount is configurable) than the bitrate x of the stream. After the burst, the node continues to forward the stream to the requesting node as and when new packets are received, typically at the normal bitrate for the stream. As noted, how much of the stream is buffered at a given node and how fast to burst the history are configurable, and these attributes may be set on a per stream basis, on a portset (a collection of streams) basis, on a per node basis, or on a per streaming media format basis.

The foregoing has outlined some of the more pertinent features of the present invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference should be made to the following Detailed Description taken in connection with the accompanying drawings, in which:

FIG. 1 is a block diagram of a known content delivery network in which the present invention may be implemented;

FIG. 2 illustrates a live streaming network without prebursting according to the present invention;

FIG. 4 illustrates a live streaming network with prebursting according to the present invention;

DETAILED DESCRIPTION

Figure 3:
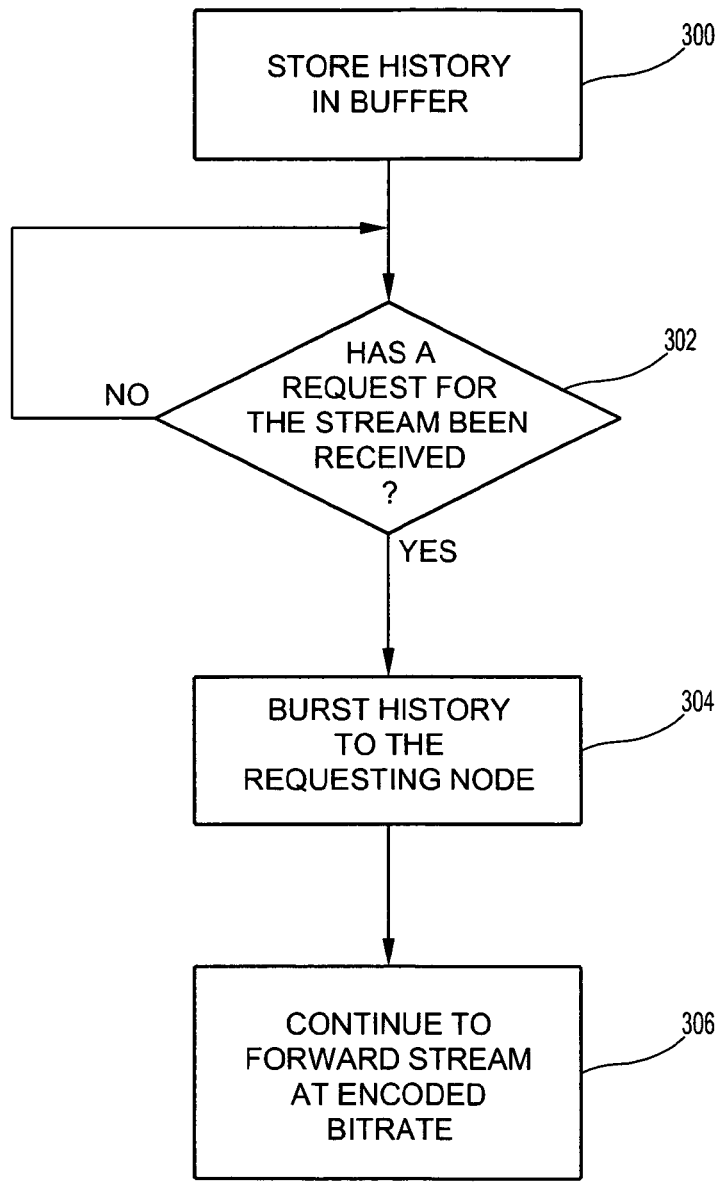
FIG. 3 is a simplified flowchart illustrating the buffering and bursting technique of the present invention.

The present invention describes a technique referred to as "prebursting," which is a feature of live streaming content delivery that drastically improves the quality of streams delivered to the end user. For background, the following describes how a live streaming CDN would work without prebursting. Thereafter, a description of prebursting is provided, illustrating how and why this functionality leads to better stream quality and performance for the end-user.

By way of background, this invention preferably is implemented in a live streaming transport network of a content delivery network. This is not a limitation of the invention, however. In one embodiment, the transport network is a "reflector" network to enable requesting end users to subscribe to live streams that have been published to CDN entry points. A reflector is a generalized packet router program. The reflector network preferably comprises a hierarchy of reflectors: at least one reflector located at each entry point to the CDN, at each edge node at which requesting users may be directed by the CDN to obtain live streams, and at various "reflector" nodes located within at least one intermediate layer (in the hierarchy) between the entry points and the edge nodes. The intermediate layer is useful to facilitate delivery of streams for which there is high demand. The edge nodes and each reflector node also include a manager program that arranges for feeds. When an end user is directed to an edge node that is not yet receiving the desired stream, the edge node's manager issues a subscription request to a set of reflector nodes. If the reflector node(s) are already receiving the desired stream, their reflector(s) begin sending it to the requesting edge node. If, however, the reflector node(s) are not already receiving the desired stream, their manager programs issue the subscription request up the hierarchy, ultimately reaching the entry point(s) to start the feed. In this illustrative live transport network, the entrypoint announces the existence of a stream to reflectors, while edge reflectors in a given region subscribe for the stream. The reflectors propagate this subscription to the entrypoint, receive the data, and propagate the data to the edge reflectors, who then send it to media servers over a backend network.

The following is provided with reference to FIG. 2. This is a description of how a live content delivery network such as described above works without prebursting. In this illustrative example, it is assumed that that the set reflectors are not already subscribed to the stream requested by the end-user. The subscription technique is described above generally and in U.S. Pat. No. 6,751,673, which is summarized below:

Step (1): An end user's media player 200 requests the stream from an edge server 202.

Step (2): The edge server 202 asks a leader process 204 in the region 206 for the stream, and one or more leaders ask their respective set reflector 208 for the stream by sending subscription messages up the network.

Step (3): The set reflector 208 sends a subscription message up to the entry point 210 for the stream.

Step (4): The entry point 210 sends the stream to the set reflector 208, which forwards the packets as it receives them from the encoder.

Steps (5) and (6): The set reflector 208 forwards the stream packets to the leader process 204 of the edge region 206, and the leader forwards them to the edge server 202 on a backend (e.g., LAN) 212, and the server sends the packet to the media player 200 of the end-user. After the media player receives a certain critical amount of data, it starts to play the stream.

The forwarding of the packets in steps (4)-(6) is done when the packets are received; therefore, typically the packets are sent from the entry point 210 to the edge servers at the encoded bitrate of the stream. Note that the steps differ from the above if the particular set reflector 208 (in this example) is already subscribed to the stream. In such case, the subscription process stops at the set reflector and need not be sent up to the entry point.

FIG. 3 illustrates the use of "prebursting" according to the present invention.

FIG. 3 is a flowchart of the process at a high level. Generally, prebursting refers to the forwarding of a given first portion (a "history") of a requested data stream from a first node to a second node at a first bitrate, and then the subsequent forwarding of a given second portion of the requested data stream from the first node to the second at a second bitrate. The first bitrate typically is much higher than the encoded bitrate of the stream and, thus, is sometimes deemed to be a "burst," thereby giving rise to the term prebursting to describe the inventive technique. Thus, as seen in FIG. 3, a given node stores a "history" of a given stream, i.e., a given portion (usually measured in "t" seconds worth of stream data). This is step 300. Of course, one of ordinary skill in the art will appreciate that the amount of the stream that is buffered in the node can be measured in other than a temporal manner, e.g., such as storing "b" bytes of data. Thus, a "history" of "t" seconds is equivalent to a history of "b" bytes that would be rendered over such "t" seconds. At step 302, a test is made to determine if a request for the given stream has been received at the given node. If not, the routine cycles. Upon receiving a request, at step 304, the given stream "bursts" the history to the requesting node at a high bitrate and then, at step 306, the first node continues to forward a remainder of the stream at or near the encoded bitrate. An important observation underlying prebursting is that to achieve high stream quality, it is generally insufficient to just forward packets through the network (i.e., from a first node to a second node) at the rate at which they are being received, i.e., it is not sufficient to always transmit packets at the encoded bitrate. Rather, according to the invention, it helps a great deal to burst some of the data at a rate much higher than the encoded bitrate of the stream.

With reference to FIG. 4, prebursting achieves the following behavior. When an end user 400 requests a stream, the content delivery network provides a short burst of data (for example, twenty (20) seconds worth of stream data) to the media player, at a high data rate (for example, eight (8) times the encoded bitrate of the stream). The remainder of the stream packets following the burst then are sent as and when they are received, i.e., at the encoded bitrate. For instance, for a 100 Kbps stream, perhaps the first 20 seconds worth of data, i.e., 20.times.100 Kbits=250 Mbytes of data, would be streamed to the edge and eventually to the end-user at a burst rate of 800 Kbps (=100K times 8), while the rest of the stream is continued to be streamed at the encoded bitrate of, say, 100 Kbps.

As seen in FIG. 4, which is merely representative, prebursting may be effected at any given node of the transport network. The steps of FIG. 4 correspond to the steps described above and illustrated in FIG. 2. Typically, every node in the transport network retains a prebursting buffer to store a "history" for every stream that goes through the node. Entry point 410 includes one or more buffers 414a-n, and set reflector 408 includes one or more buffers 416a-n, for this purpose. The size of a given buffer preferably is configurable on a per-stream, per-portset, per-node or per-media format basis, to maximize performance. Preferably, each node includes the capability to buffer a given stream, but this is not a requirement of the invention. It may be desirable to enable prebursting in different portions of the transport network, such as between an entry point and a set reflector, between an intermediate set reflector and an edge region, or between edge servers in a given edge region, or any combination. More generally, the present invention envisions the use of the prebursting technique between any first and second nodes of a streaming transport network, and the first and second nodes may comprise any given hardware, operating system, packet forwarding engine, streaming media server, or media player. Thus, the inventive technique may be carried out between a media server (the first node) and a given end user machine running a web browser and media player plug-in (the second node), although typically the invention will be implemented across transport nodes in the CDN.

Prebursting in this manner typically results in drastic improvements in the quality of the stream delivered to the end-user. Thus, for example, assume stream quality is measured using several different metrics, e.g.: (a) failure percent, or how often the stream failed to start and play; (b) startup time, or how quickly the stream started to play after the user hits the "play" button; (c) thinning and loss percentage, or what fraction of the information was thinned at the server or lost in transit to the end-user resulting in degradation in what the user sees (e.g., slide show-like presentations); and (d) rebuffering, or how often and how long did the playback freeze because the media player did not have information in its buffer to continue the play. Prebursting can significantly improve at least several of these metrics as outlined below.

Figure 5:
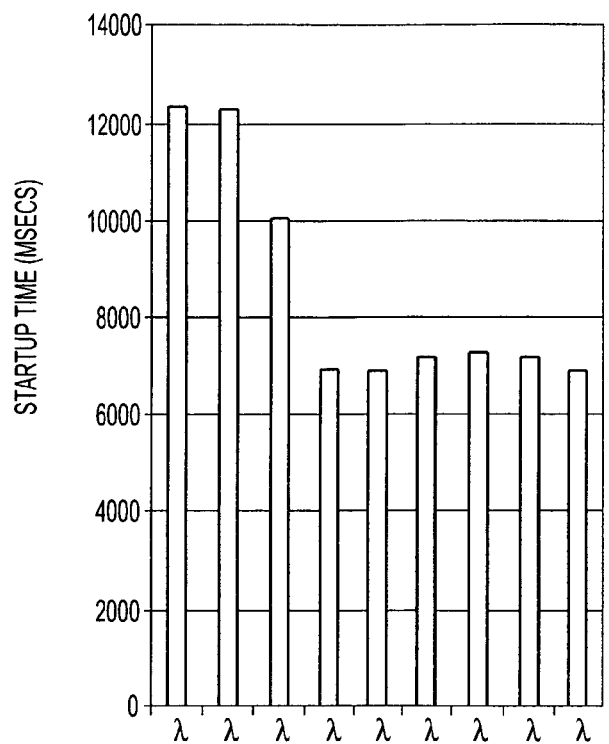
FIG. 5 is a graph illustrating how prebursting reduces stream startup time.

The startup time for the streams decrease significantly because the initial information needed by the media player to start the stream is transmitted through the network and to the media player at a much more rapid rate. This is illustrated in the graph of FIG. 5.

There is less thinning and loss in the playback when prebursting is used because there is more loss recovery. Prebursting enables the media player to buffer several seconds of data ahead of what is currently being played-back to the end-user.

Therefore, the media player has more time to recover a missing packet. Thus, for example, if the media player is able to buffer the packets to be played back at t+15 seconds at time t, then it has roughly 15 seconds to recover a missing packet because the missing packet would not be needed for playback for 15 more seconds.

There are fewer incidents of rebuffering due to prebursting for similar reasons.

Figure 6:
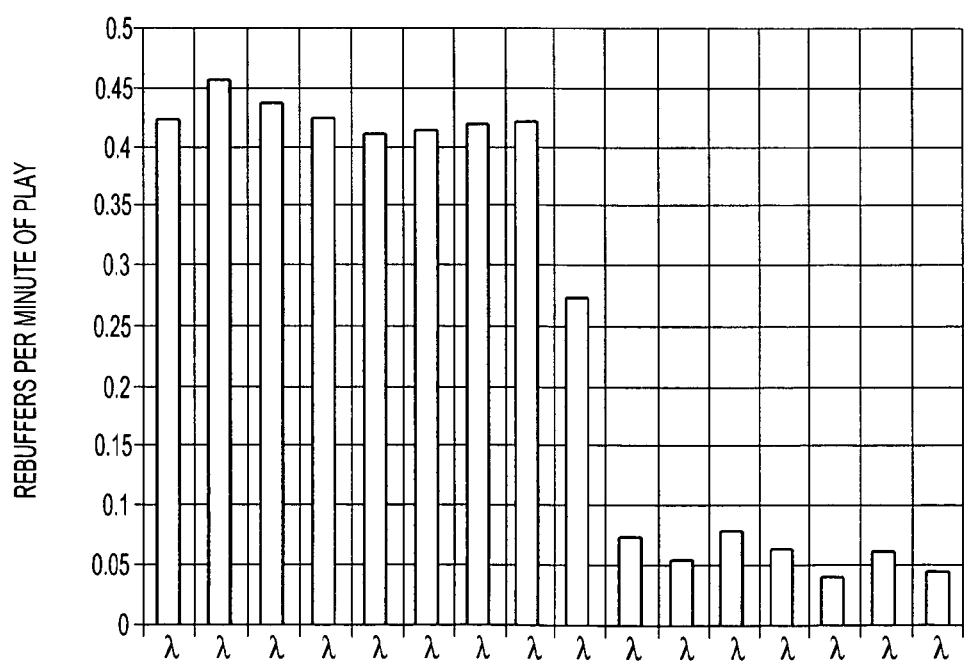
FIG. 6 is a graph illustrating how prebursting reduces stream rebuffering.

Because prebursting enables the media player to buffer several seconds of data ahead of what is being played-back, it is much less likely that the media player would run out of data causing it to interrupt the playback. This is illustrated in FIG. 6.

The performance enhancements due to prebursting vary from stream to stream and from one format to another. For instance, for WMS, experimental results have shown a factor 2.9 improvement in startup times for some streams (from 18.7 seconds without prebursting to 6.3 seconds with prebursting). This is illustrated in the graph of FIG. 5, which illustrate how a stream startup time changed from about 12 seconds to 7 seconds once prebursting was employed. For some Real streams, experimental results have shown rebuffer frequency down drastically by factors of 20 or so, and startup times reduced by 3 seconds. This is illustrated in the graph of FIG. 6.

The following is a brief description of how the live content delivery network works with prebursting. As used herein, the generic term "node" typically denotes an entry point, a set reflector, or a leader/edge server in the edge region. According to one embodiment, each node in the network stores preburst_buffer_size=X seconds worth of history of every stream to which it is currently subscribed. That is, at time t, the node stores packets for the stream from time t-X to t in its preburst buffer. When a node A sends up a subscription request for a stream to node B, node B sends to node A its history of X seconds of the stream that is currently stored in its preburst buffer. The history is sent at a rate of preburst_factor=Y times the encoded bitrate of the stream. Of course, Y need not be an integer or exact multiple of the encoded bitrate. After the history is sent, node B will continue to send packets for the stream to node A at the rate at which it is receiving them, i.e., at the encoded bitrate of the stream. Preferably, both preburst_size and preburst_rate are configurable parameters and can be tuned depending on the format (WMS, Real, Quicktime), stream properties (encoded bitrate, audio versus video, and so forth) to maximize the stream quality of the end-user.

FIG. 4 illustrates an embodiment of the live stream delivery with prebursting. For simplicity, assume that the set reflectors 408 are not subscribed to the stream requested by the end-user, and so the subscription travels up to the entry point 410.

Step (1): The end user's media player 400 requests the stream from an edge server 402.

Step (2): The edge server 402 asks the leader process 404 in the region 406 for the stream, and one or more leaders ask their respective set reflectors 408 for the stream by sending a subscription message up the network.

Step (3): The set reflector 408 sends a subscription message up to the entry point 410 for the stream.

Step (4): The entry point 410 (in this example) bursts its stored history for the stream (from a buffer 414) to the set reflector 408. Then, the set reflector 408 continues to forward the packets as it receives them from the encoder (i.e., at the encoded bitrate).

Steps (5) and (6): The set reflector 408 forwards the stream to the leader 404 of the edge region 406, and the leader forwards to the edge server 402 on a backend network 412 (a LAN connecting the edge servers in a region), and the server 402 sends the packet to the media player on the end-user client machine. The packets are forwarded as and when they are received. After the media player receives a certain amount of data, it starts to play the stream.

Note that in the above instance the preburst happens only once, in this case at the entry point, and the nodes downstream from the entry point just forward the packets at the rate they receive them. More generally, because downstream nodes forward packets at the rates received, it is typically only necessary to preburst at just one point along the stream transport path. Thus, if there are three serial nodes, node A, node B and node C, a preburst implemented at node A generates packets that node B's packet forwarding engine will end up delivering to node C in a preburst manner, and this is the case even though node B is not buffering for this purpose. In the example, the prebursted data travels at an accelerated rate to the edge and gets streamed to the end user so that the user receives the ultimate benefit of the upstream preburst.

In the case where the set reflector 408 is already subscribed to, the processing is similar to the above, except that the subscription process stops at the set reflector, and the set reflector (instead of the entry point) sends down a burst of packets from its preburst buffer 416 to the subscribing edge region. In the remaining case, where the leaders are subscribed to the stream but the edge server is not, the leader process 404 preferably prebursts to the edge server from its preburst buffer 418 on the region backend network.

Although not required, an application (e.g., a set reflector, a leader process, or the like) that is already receiving data may ignore preburst data as duplicates, while one that is waiting for a preburst may ignore regular packets until the preburst packet sequence numbers "catch up" with the regular packets or a specified timeout (e.g., 2 seconds) passes with no preburst data arriving.

A representative subscription mechanism is described in U.S. Pat. No. 6,751,673, and incorporated herein by reference. There is no requirement that the present invention be used in the context of a subscription mechanism, of course.

Many of the functions described above have been described and illustrated as discrete programs. One of ordinary skill will appreciate that any given function, alternatively, may comprise part of another program. Thus, any reference herein to a program should be broadly construed to refer to a program, a process, an execution thread, or other such programming construct. As a concrete example, the programs referred to above may run as separate threads within a larger program. Generalizing, each function described above may be implemented as computer code, namely, as a set of computer instructions, for performing the functionality described via execution of that code using conventional means, e.g., a processor, a machine, a set of connected machines, a system, or the like.

This technique provides significant advantages in that it reduces stream startup time, and it reduces stream rebuffers as the stream is viewed by a requesting end user that has been mapped to a media server in a distributed computer network such as a content delivery network. In addition, prebursting reduces unrecoverable stream packet loss by affording nodes in the transport network an opportunity to recover lost packets.

Having described my invention, what I claim is as follows:

1. A transport network, comprising, in combination:
    one or more content provider entry point machines;
    a set of one or more of reflector machines;
    a set of edge node machines to which requesting end users are directed to obtain a live data stream that is published to the transport network;
    computer memory located in a given machine in the transport network and holding computer program instructions executed by a hardware processor, the computer program instructions comprising:
        program code to receive a burst portion of the live stream from a first machine in the transport network, the burst portion received at a rate that is higher than an encoded bitrate of the live stream, the burst portion representing an amount of the live stream stored at the first machine during a given time period;
        program code operative after the burst portion of the live stream is received from the first machine to receive a second portion of the live stream from the first machine, the second portion received at the encoded bitrate of the live stream; and
        program code to process the burst portion of the live stream to enable data packets associated with the burst portion to align with data packets associated with the second portion.

2. The transport network as described in claim 1 wherein the burst portion of the live stream is configurable.

3. The transport network as described in claim 1 wherein the rate at which the given portion is received from the first node is a given multiple of the encoded bitrate of the live stream.

4. The transport network as described in claim 3 wherein the rate is configurable.

5. The transport network as described in claim 1 wherein the given machine is one of the entry point machines.

6. The transport network as described in claim 1 wherein the given machine is one of the reflector machines.

7. The transport network as described in claim 1 wherein the given machine is one of the edge node machines.

* * * * *